Figure 1:
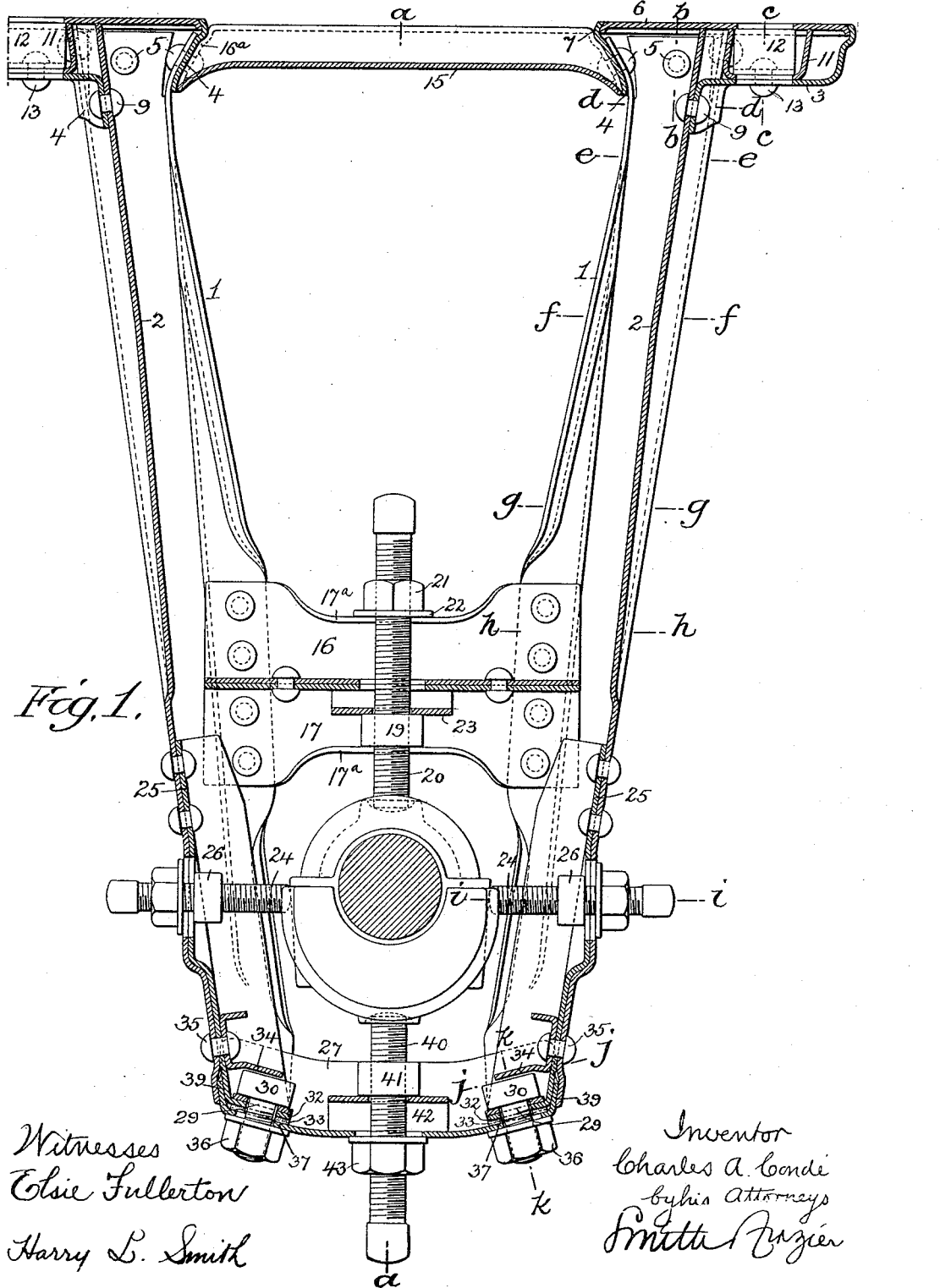

C. A. CONDÉ.
SHEET METAL SHAFT HANGER.
APPLICATION FILED JULY 26, 1910.

1,130,709.

Patented Mar. 9, 1915.
3 SHEETS—SHEET 1.

Witnesses
Elsie Fullerton
Harry L. Smith

Inventor
Charles A. Condé
by his Attorneys
Smith Frazier

C. A. CONDÉ.
SHEET METAL SHAFT HANGER.
APPLICATION FILED JULY 26, 1910.
1,130,709.
Patented Mar. 9, 1915.
3 SHEETS—SHEET 2.
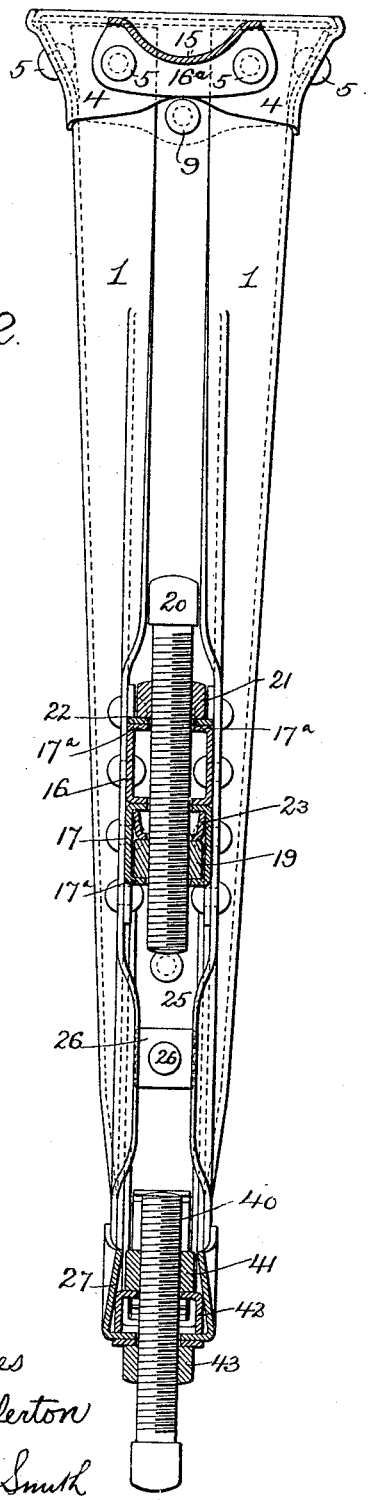
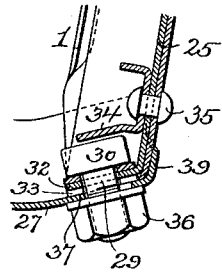
Fig. 13.
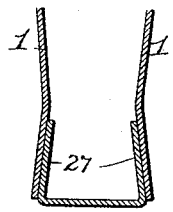
Fig. 14.
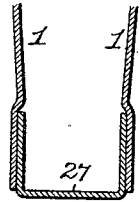
Fig. 15.
Witnesses
Clare Fullerton
Harry L. Smith
Inventor
Charles A. Condé
by his Attorneys C. A. CONDÉ.
SHEET METAL SHAFT HANGER.
APPLICATION FILED JULY 26, 1910.
1,130,709.
Patented Mar. 9, 1915.
3 SHEETS—SHEET 3.
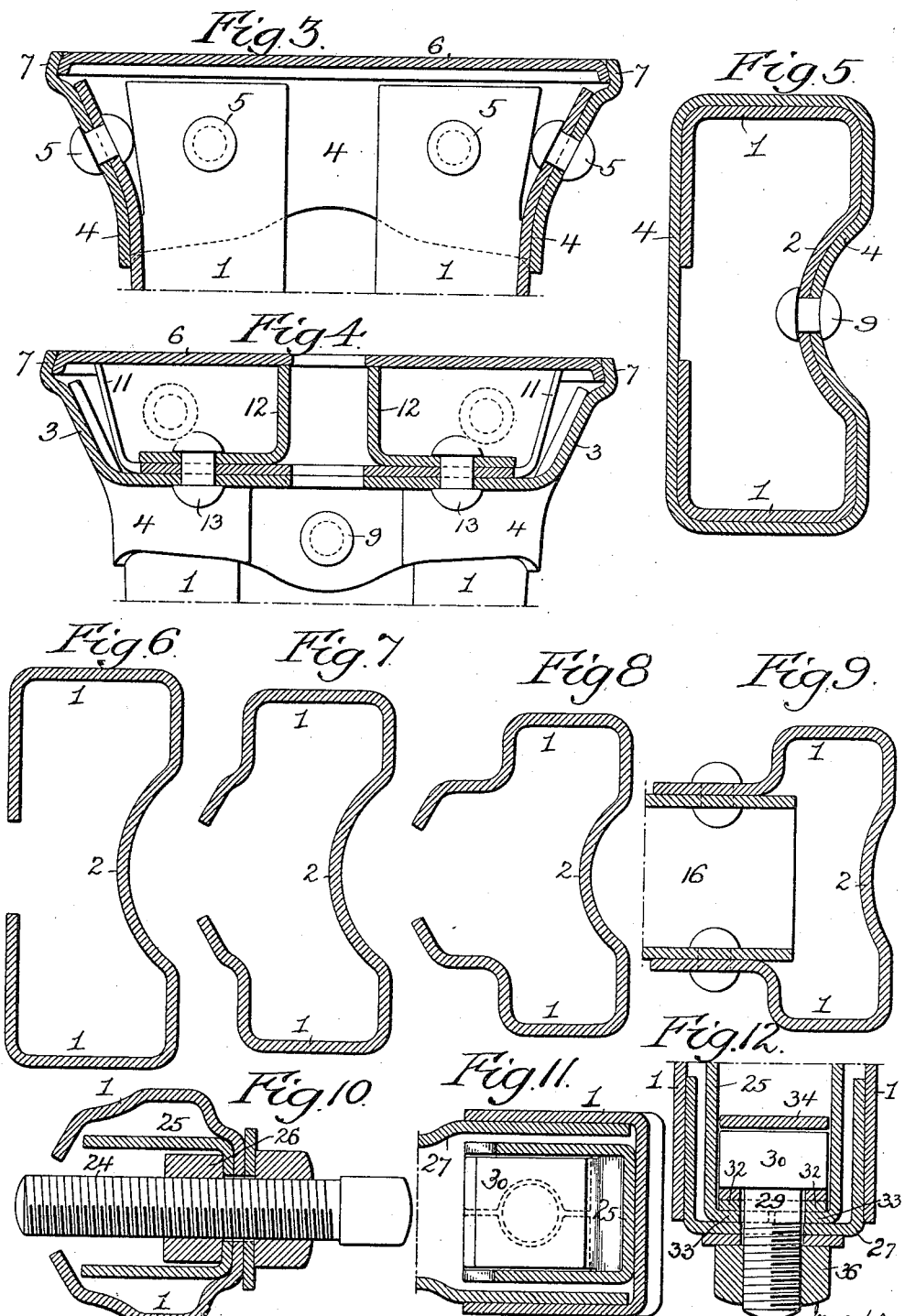

UNITED STATES PATENT OFFICE.

CHARLES A. CONDÉ, OF CAMDEN, NEW JERSEY, ASSIGNOR TO BOND FOUNDRY AND MACHINE COMPANY, OF MANHEIM, PENNSYLVANIA, A CORPORATION OF PENNSYLVANIA.

SHEET-METAL SHAFT-HANGER.

1,130,709.  Specification of Letters Patent.  Patented Mar. 9, 1915.

Application filed July 26, 1910. Serial No. 574,007.

*To all whom it may concern:*

Be it known that I, CHARLES A. CONDÉ, a citizen of the United States, residing in Camden, New Jersey, have invented certain Improvements in Sheet-Metal Shaft-Hangers, of which the following is a specification.

My invention consists of certain improvements in the sheet metal shaft hanger constituting the subject of my Letters Patent No. 966,527, dated August 9, 1910, the object of my present invention being to simplify, strengthen and cheapen the construction of the various parts of the hanger, all as hereinafter fully set forth.

In the accompanying drawings—Figure 1 is a vertical longitudinal section of my improved hanger showing the shaft box in position therein; Fig. 2 is a vertical transverse section on the line $a$—$a$, Fig. 1; Fig. 3 is a vertical transverse section on the line $b$—$b$, Fig. 1; Fig. 4 is a vertical transverse section on the line $c$—$c$, Fig. 1; Fig. 5 is a horizontal section on the line $d$—$d$, Fig. 1; Fig. 6 is a horizontal section on the line $e$—$e$, Fig. 1; Fig. 7 is a horizontal section on the line $f$—$f$, Fig. 1; Fig. 8 is a horizontal section on the line $g$—$g$, Fig. 1; Fig. 9 is a horizontal section on the line $h$—$h$, Fig. 1; Fig. 10 is a horizontal section on the line $i$—$i$, Fig. 1; Fig. 11 is a horizontal section on the line $j$—$j$, Fig. 1; Fig. 12 is a vertical transverse section on the line $k$—$k$, Fig. 1; Fig. 13 is a longitudinal vertical section of a modified construction of hanger leg and yoke, and Figs. 14 and 15 are transverse vertical sections, illustrating different forms of side webs of leg and yoke, used in such construction.

The hanger resembles that of my former application in that it consists of opposite depending side legs, feet at the upper ends of said legs, connected or not by a cross brace, as desired, an intermediate cross brace, and a bottom yoke, the side legs carrying the horizontal screws and the intermediate brace and yoke carrying the vertical screws whereby the shaft box is supported and adjusted. The side legs each consist, as before, of a hollow box-like girder 1 having a back web, side webs and inner flanges, the latter being parallel with the back web in the upper portion of the leg but said flanges being gradually bent as they approach the intermediate cross brace, as shown in Figs. 6, 7, and 8, until they assume a position at right angles to the back web, as shown in Fig. 9, for the attachment of the side webs of the said intermediate brace to which they are secured by means of transverse rivets or bolts, as shown in Fig. 9, the inner edges of the flanges being then bent toward each other again, as shown in Fig. 10, at a point between the intermediate brace and the bottom yoke, and being again straightened as shown in Fig. 11, so as to be parallel with or bear against the side webs of said yoke, as shown in Figs. 11, 12 and 13, the outer web of each leg having a central, inwardly projecting rib 2 formed upon it in order to increase the rigidity of the leg, as shown in Figs. 6, 7 and 8. The foot member at the upper end of each leg consists of a cup-like outer portion 3 and an inner downwardly projecting socket 4 which receives the upper end of the leg and conforms in shape thereto, as shown in Fig. 5. The contacting webs of the leg and socket are flared from bottom to top, as shown in Figs. 1 and 3, and are secured together by rivets or bolts 5, as shown in Figs. 1 and 3, and said foot member is closed at the top by a cap plate 6 which is secured in place by crimping the upper portion of the foot member 2 inwardly over the down-turned edges of the cap plate, as shown at 7 in Fig. 1. The outer web of the socket 4 follows the contour of the rib 2 and is secured to the outer web of the leg by means of a bolt or rivet 9, as shown in Fig. 5.

In order to stiffen and strengthen the cup-shaped portion of the foot member, the latter is provided with a transverse channel bar 11 interposed between the base of said cup-shaped portion and the cap plate 6, and to further stiffen this portion of the foot member, longitudinal angle bars 12 are disposed between the base of the channel 11 and the cap plate 6 on each side of the opening in the foot member intended for the reception of the bolt or bolts whereby the hanger is secured to the joist or other support therefor, the bases of the channels 11 and 12 being secured to the base of the cup-shaped portion 3 of the foot member by means of bolts or rivets 13, as shown in Fig. 4.

In hangers of small size the foot members 2 may be disconnected from one another but in hangers of a larger size I connect them by means of a top brace 15 of channel form, this brace having, at each end, a flaring web 16ª which is secured to the flaring inner web of the socket 4 by the same bolts or rivets 5 which secure the inner flanges of the leg member thereto.

The intermediate cross brace is of H-shaped cross section, as before, and is preferably composed of two channel bars 16 and 17 disposed back to back and having their meeting webs suitably bolted or riveted to one another, but in the present hanger the side webs of each of these channel bars are turned inward toward each other so as to form flanges 17ª, those of the lower channel bar providing a support for the nut 19 which receives the upper adjusting screw 20 for the shaft box, and those of the upper channel bar supporting the lock nut 21, or a washer 22, which is interposed between said flanges and the lock nut. A short channel bar 23 is interposed between the nut 19 and the base web of the lower channel bar 17, as shown in Fig. 2, so as to vertically confine the nut 19.

Each of the side adjusting screws 24 for the shaft box passes, as before, through an opening in a vertical offset of the back web of the corresponding leg 1 and through a like opening in a reinforcing plate 25 bolted or riveted to the inner face of said web, the bolt being adapted to a nut 26 which is prevented from turning by contact with the side webs of said reinforcing plate, as shown in Fig. 10.

The yoke 27 which connects the legs 1 at their lower ends consists of a channel bar whose side flanges, in the hanger shown in Fig. 1, lie inside of the side webs of the legs, 1, the bottom web of the yoke underlying the legs, as shown in Fig. 12, and being secured thereto by bolts 29, the head 30 of each bolt bearing upon a washer which rests upon an inturned flange 32 of the back web of the reinforcing plate 25, this flange overlapping inturned flanges 33 at the lower ends of the side webs of said reinforcing plate, as shown in Fig. 12. Turning of the bolt head 30 is prevented by contact of the same with the side webs of the reinforcing plate and vertical displacement of the bolt is prevented by means of a retainer plate 34, which is secured in place by means of a bolt or rivet 35 passing through it and also through the back webs of the reinforcing plate and leg, as shown in Fig. 1. A nut 36 is applied to the lower end of the bolt 29 and bears against the bottom web of the yoke 27 or against a washer interposed between said web and the nut, or, if desired, a rivet may replace the bolt and nut as a means of securing the yoke to the lower ends of the legs. In order to aid in resisting lateral strain which might otherwise be exerted upon the bolts or rivets whereby the yoke is secured to the legs of the hanger, the bottom web of the yoke is, at each end, inclined upwardly as at 37 so as to resist lateral separation of the lower ends of the legs and the outer end of said base web of the yoke is bent upwardly as at 39 so as to be confined between the reinforcing plate 25 and the back web of the leg at the lower end of the same. The lower adjusting screw 40 for the shaft box is adapted to a nut 41, which is supported upon a channel bar 42 in the yoke, turning of said nut being prevented by bending in the side webs of the yoke, as shown in Fig. 2, so as to bring them into close relation to or contact with the sides of the nut. A lock nut 43 for the lower adjusting screw 40 bears upon the bottom web of the yoke or upon a washer interposed between the said web and the nut.

In the present hanger the connections between the upper ends of the legs and the foot member 3 is more substantial than in the hanger constituting the subject of my previous application, the construction of the intermediate cross brace is simplified, the number of parts composing the same is reduced, and the yoke connection at the bottom of the hanger is strong and rigid.

The side webs of the bottom yoke may, if desired, be located on the outside of the side webs of the legs, as shown in Fig. 13, and the flanges 39 may be located outside of the back webs of the reinforcing plates. In constructing the hanger shown in Fig. 1 the side webs of the legs and yoke may be beveled, as shown in Fig. 14, to resist upward pressure, or said side webs of the legs may be offset to form shoulders for bearing against the side webs of the legs, as shown in Fig. 15 for the same purpose.

The terms "upper" and "lower" as used herein are not to be taken as indicating that the hanger is necessarily to be used as a depending hanger, as it is evident that it can be reversed and mounted upon a floor or other support so as to constitute a shaft supporting pedestal.

I claim:

1. In a sheet metal shaft hanger, the combination of a hollow, girder-shaped leg, a foot member having a socket thereon for the reception of said leg, and a cup-like portion extending outwardly from said socket.

2. In a sheet metal shaft hanger, the combination of a hollow, girder-shaped leg, with a foot member to which said leg is secured, said foot member having a cup-shaped portion with an internal transverse channel bar.

3. In a sheet metal shaft hanger, the combination of a hollow, girder-shaped leg, with a foot member to which said leg is secured, said foot member having a cup-shaped portion with an internal transverse channel bar, and a pair of longitudinal angle bars spaced apart within said transverse channel bar.

4. A sheet metal shaft hanger having girder-shaped side legs, a yoke for connecting the bottom portions of the legs, a reinforcing plate on each leg, having flanges at the bottom, and bolts passing through the bottom web of the yoke and through the flanges of the reinforcing plate.

5. A sheet metal shaft hanger having girder-shaped side legs, a yoke connecting the lower portions of said legs, reinforcing plates having inturned flanges both on its back web and on its side webs, and bolts passing through said flanges and through the bottom web of the yoke.

6. A sheet metal shaft hanger having girder-shaped side legs, and a yoke connecting the lower ends of said side legs and having side webs disposed inside of the side webs of the legs, the latter being offset so as to resist upward thrust upon the yoke.

7. A sheet metal shaft hanger having girder-shaped side legs, and a yoke connecting the lower ends of said side legs and having side webs disposed inside of the side webs of the legs, the side webs both of the legs and yoke being offset to resist upward thrust upon the yoke.

8. A sheet metal shaft hanger having girder-shaped side legs, reinforcing plates on the inside of the same, and a bottom yoke having upturned end flanges confined between the back webs of the legs and the reinforcing plates.

In testimony whereof, I have signed my name to this specification, in the presence of two subscribing witnesses.

CHARLES A. CONDÉ.

Witnesses:
 KATE A. BEADLE,
 HAMILTON D. TURNER.

Copies of this patent may be obtained for five cents each, by addressing the "Commissioner of Patents, Washington, D. C."